July 9, 1946.
J. JACKSON
2,403,601
HAIR-GRIP PIN
Filed Feb. 9, 1943
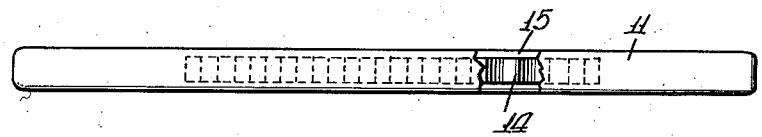
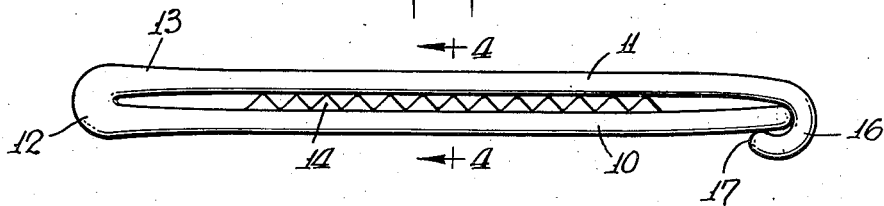
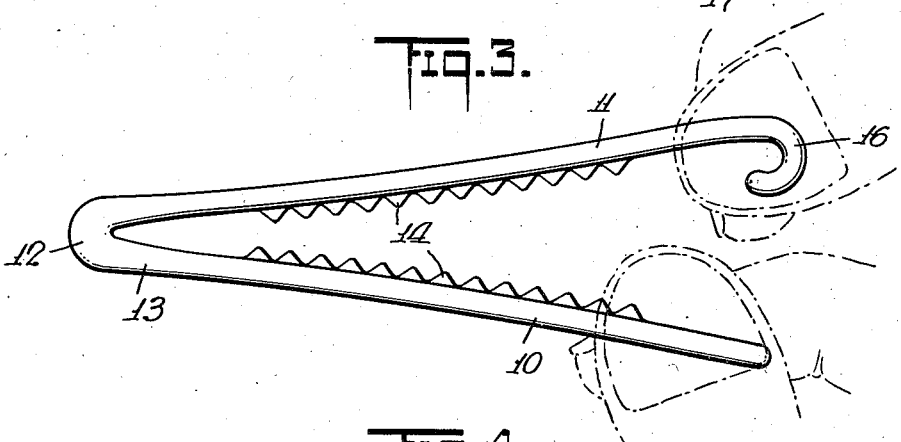
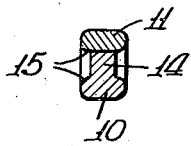
INVENTOR
Jules Jackson
BY
Dean Fairbank & Hiesel
ATTORNEYS
43-29

Patented July 9, 1946

2,403,601

UNITED STATES PATENT OFFICE 2,403,601

HAIR-GRIP PIN

Jules Jackson, New York, N. Y.

Application February 9, 1943, Serial No. 475,249

2 Claims. (Cl. 132—48)

It is among the objects of the invention to provide a hair-grip pin which shall inherently exert effective pressure upon the width of the strand of hair being held thereby, which shall maintain such pressure unrelaxed as long as the pin is in place, which shall be attractive in appearance and relatively low in cost, which may be easily applied and easily removed, and which in its preferred embodiment shall avoid the use of metal.

In the accompanying drawing in which is shown one of various possible embodiments of the several features of the invention, Fig. 1 is a lateral edge view of the hair-grip pin on an enlarged scale with parts broken away, Fig. 2 is a side elevation of the pin shown closed, Fig. 3 is a perspective view showing the pin spread apart for application or removal from the hair, and Fig. 4 is a transverse sectional view taken on line 4—4 of Fig. 2.

Referring now to the drawing, there is shown an integral hair-grip pin comprising a pair of generally parallel shanks 10 and 11, of suitable length, ordinarily about two inches, of thickness considerably less than their width and which have the hair-pin turn connection 12 between their root ends 13. In a preferred embodiment, the shanks are thickened progressively at said root ends 13 to maximum thickness at the hair-pin turn 12.

The major part of the length of each shank desirably midway between the ends thereof, has a sequence of tapering teeth 14 rising from the inner face thereof. Any desired number of teeth may be used and these are of uniform height, width and thickness, each being preferably in the form of an isosceles triangle with a rounded vertex. In one practical embodiment the base of each tooth is $\frac{1}{12}$ inch long, and its vertex angle about 100 degrees. As indicated in the drawing, there may be twelve teeth on shank 11 and thirteen teeth on shank 10, the teeth being arranged on the shanks so as to intermesh when the pin is closed as shown in Fig. 2. Thus the teeth on shank 10 engage and straddle all those on shank 11. Desirably, the overall thickness of the closed hair-grip pin is less than $\frac{3}{16}$ inch.

Preferably, the teeth are of thickness less than the width of the shank and midway between the lateral edges of the shank. Desirably each shank is about $\frac{1}{8}$ inch wide and the teeth $\frac{1}{16}$ inch thick, so that the teeth are flanked by the lateral ledges 15 of the shank, and each of said ledges is about $\frac{1}{32}$ inch wide. The user's fingers are thus not apt to touch the edges of the teeth and the attractiveness of the pin is moreover enhanced.

In a preferred embodiment, shank 11 has a unitary hook extension 16 at the free end thereof which in locked position of the pin closely embraces the extremity of the unhooked shank 10. The extremity of the straight shank 10 engages the middle of the loop 16, while the free end 17 of the loop engages the outer face of the shank 10 when the pin is closed.

As will appear from Fig. 3, the hair-grip pin when made of plastic may be bent in the correct manner for application, with the same facility as a steel pin. The hair-pin turn 12, by reason of its thickness, is stiff and will not spread when the free ends are drawn apart as shown in Fig. 2. Moreover, each shank will be bowed on a uniform arc of large radius, by reason of the fact that the teeth 14 act as beam stiffeners, and the flexure will occur at the uniformly spaced troughs between the teeth, as indicated. The pin, when made of cellulose acetate plastic, will thus flex substantially in the manner of the conventional hair-grip pin, and will suffer no undue strain in such flexure. Such plastic pin has sufficient elasticity to return to closed position, in which the free end of the straight shank 10 may readily be inserted laterally into the hook 16.

In use, it will be seen that the teeth 14 act substantially as a comb in spreading the hair uniformly therebetween as the pin is applied. Considerable pressure is exerted upon the hair clamped between the intermeshing teeth and that pressure is substantially uniform along the toothed area and is effectively maintained throughout. The effectiveness of the grip results from the holding effect of the locking hook combined with the stiffening effect due to the I-beam cross-section of the locked pin as shown in Fig. 4. The pin is as readily removed as it is applied.

As many changes could be made in the above construction and many apparently widely different embodiments of this invention could be made without departing from the scope of the claims, it is intended that all matter contained in the above description or shown in the accompanying drawing shall be interpreted as illustrative and not in a limiting sense.

Having thus described my invention, what I claim as new and desire to secure by Letters Patent of the United States is:

1. An integral hair-grip pin of plastic material comprising a pair of generally parallel shanks of thickness less than their width, a hair-pin turn connection therebetween, said connection being of thickness greater than that of said shanks, each of said shanks having unitary tapering teeth at the inner face thereof, the teeth of the respective shanks intermeshing when the pin is closed, said teeth being of thickness less than the width of the respective shanks and substantially midway between the lateral edges of said shanks, so that in closed position they determine with the shanks a stiffened I-beam structure.

2. An integral hair-grip pin comprising a pair of generally parallel shanks connected by a hair-pin turn, said shanks being of thickness progressively increasing near the root ends thereof to maximum thickness at said hair-pin turn, intermeshing teeth unitary with and protruding from the inner faces of the respective shanks beyond said root ends, said teeth being of uniform width and height, means clamping the pin in closed position when in use, said teeth being of thickness less than the width and midway between the lateral edges of the shanks, so that in closed position they determine with the shanks a stiffened I-beam structure.

JULES JACKSON.